United States Patent
Gehres

(10) Patent No.: US 11,563,221 B2
(45) Date of Patent: Jan. 24, 2023

(54) PLUG CONNECTOR, BIPOLAR PLATE AND COMBINATION OF A PLUG CONNECTOR AND A FUEL CELL STACK

(71) Applicant: AUDI AG, Ingolstadt (DE)

(72) Inventor: Sebastian Gehres, Untereisesheim (DE)

(73) Assignee: Audi AG, Ingolstadt (DE)

( * ) Notice: Subject to any disclaimer, the term of this patent is extended or adjusted under 35 U.S.C. 154(b) by 79 days.

(21) Appl. No.: 16/581,255

(22) Filed: Sep. 24, 2019

(65) Prior Publication Data

US 2020/0099064 A1    Mar. 26, 2020

(30) Foreign Application Priority Data

Sep. 25, 2018   (DE) ............... 10 2018 216 265.4

(51) Int. Cl.
    *H01M 8/0247*   (2016.01)
(52) U.S. Cl.
    CPC ................ *H01M 8/0247* (2013.01)
(58) Field of Classification Search
    CPC ....... H01M 2008/1095; H01M 8/0247; H01M 8/04552; H01M 8/0202; H01M 8/2465; Y02E 60/50
    See application file for complete search history.

(56) References Cited

U.S. PATENT DOCUMENTS

| | | | |
|---|---|---|---|
| 4,828,939 A | 5/1989 | Turley et al. | |
| 6,933,069 B2* | 8/2005 | Sato ............... | H01M 8/04246 429/430 |
| 2002/0177019 A1* | 11/2002 | Aoto ............... | H01M 8/2465 429/432 |
| 2003/0072983 A1 | 4/2003 | Kikuchi et al. | |
| 2005/0186456 A1* | 8/2005 | Andreas-Schott .. | H01M 8/0247 429/432 |
| 2007/0108960 A1 | 5/2007 | Chang et al. | |
| 2007/0190391 A1 | 8/2007 | Otschik et al. | |
| 2016/0231391 A1* | 8/2016 | Katano ............. | G01R 31/3835 |
| 2018/0090771 A1 | 3/2018 | Berggren et al. | |

FOREIGN PATENT DOCUMENTS

| | | |
|---|---|---|
| CN | 107534120 A | 1/2018 |
| DE | 102 23 186 A1 | 12/2002 |
| DE | 10 2005 007 365 A1 | 9/2005 |
| DE | 10 2010 014 080 A1 | 12/2010 |
| DE | 102013206129 A1 | 10/2014 |
| DE | 10 2016 210 316 A1 | 12/2017 |
| DE | 102016115100 A1 | 1/2018 |
| EP | 2 907 188 B1 | 12/2016 |

* cited by examiner

*Primary Examiner* — Adam A Arciero
(74) *Attorney, Agent, or Firm* — Seed Intellectual Property Law Group LLP

(57) ABSTRACT

A plug connector is provided for making electrical contact with a multiple number of bipolar plates having a contact groove. The plug connector includes a plug body formed from electrically insulating material, through which plug body a multiple number of electrically separated contact elements are guided, one contact element of each of which engaging in a corresponding contact groove of one of the bipolar plates and thereby making electrical contact with the bipolar plate. Each of the contact elements takes the form of an elastically deformable wire bracket engaging in the contact groove. A bipolar plate may be combined with a plug connector and other components of a fuel cell stack.

8 Claims, 6 Drawing Sheets

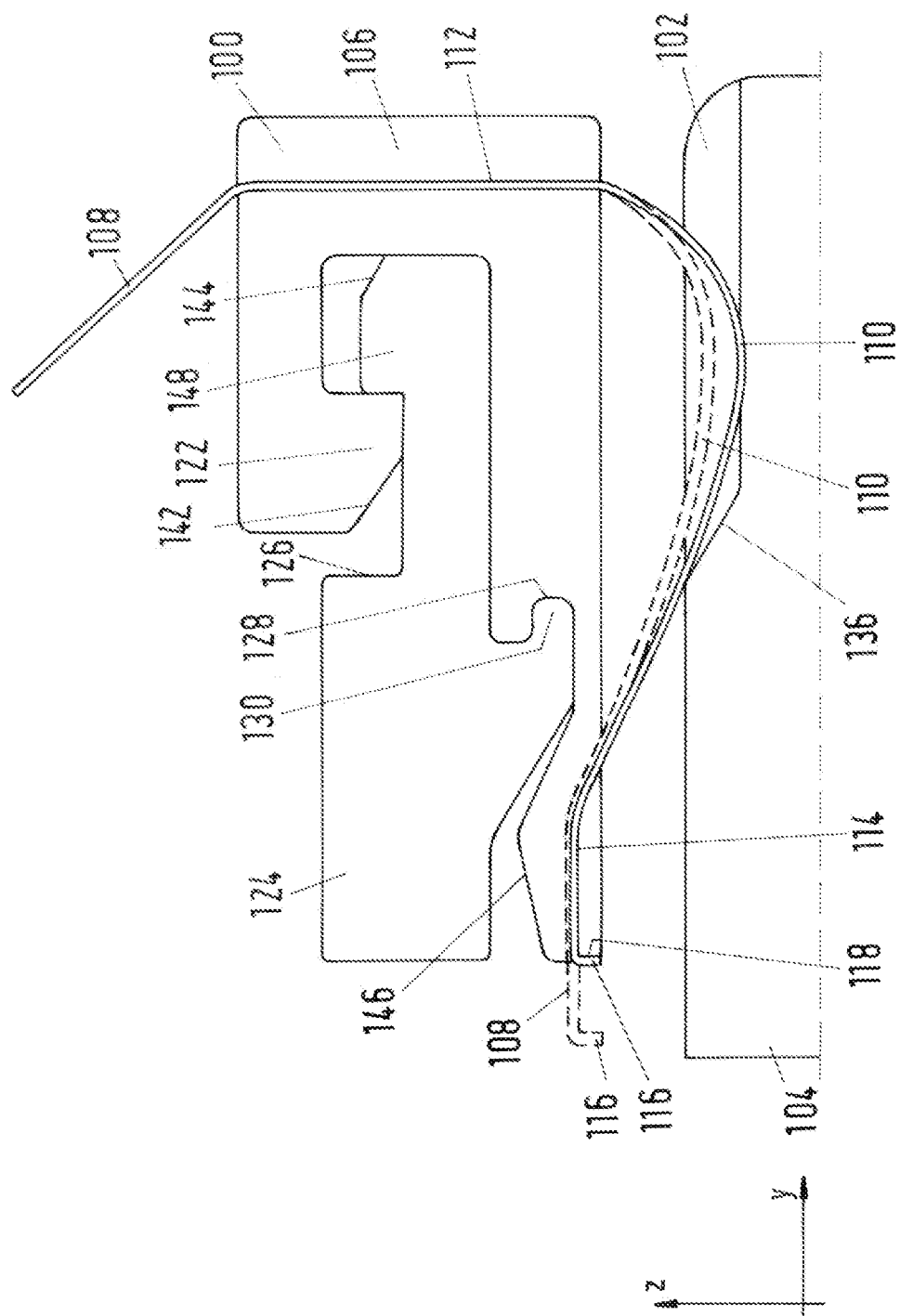

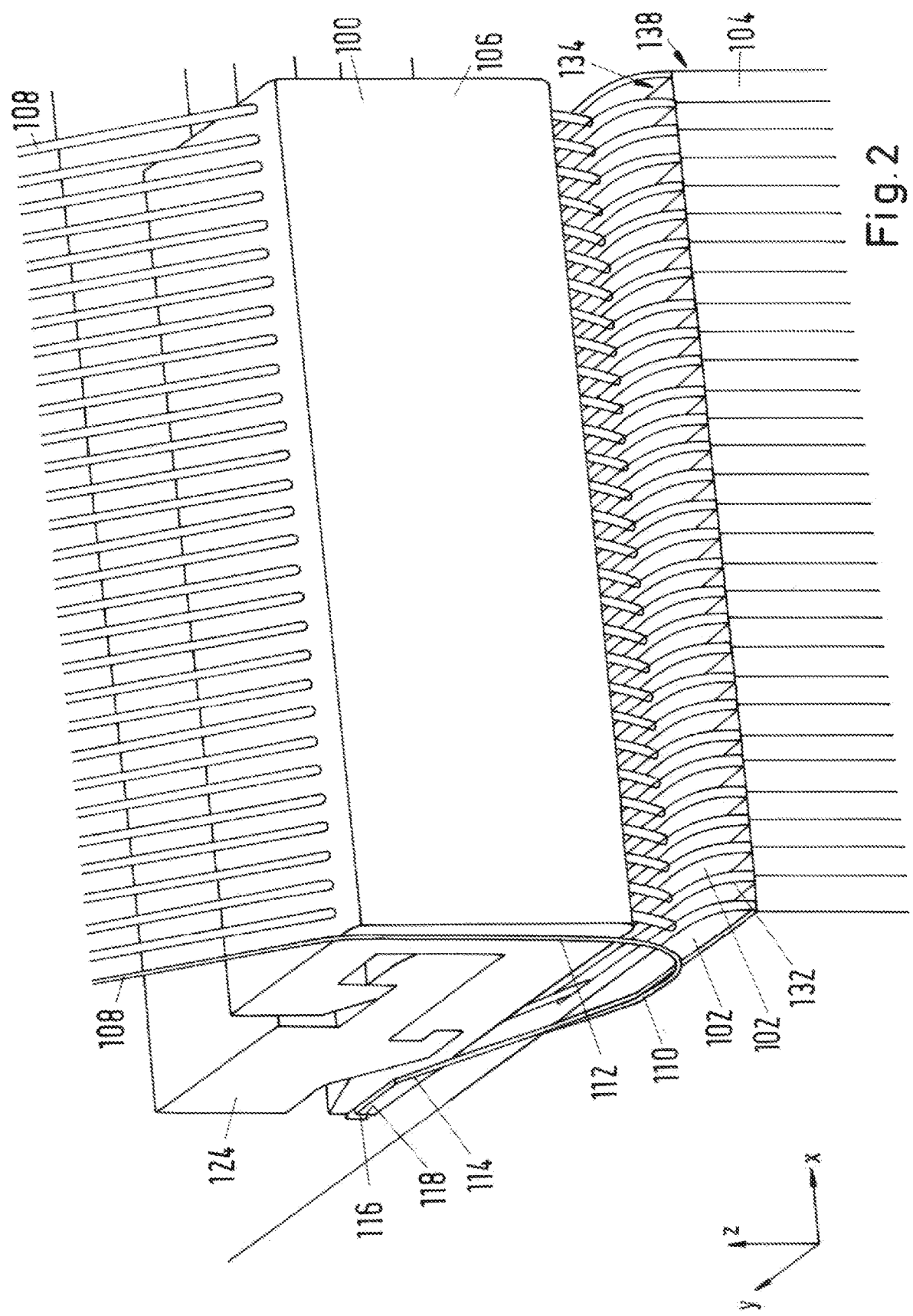

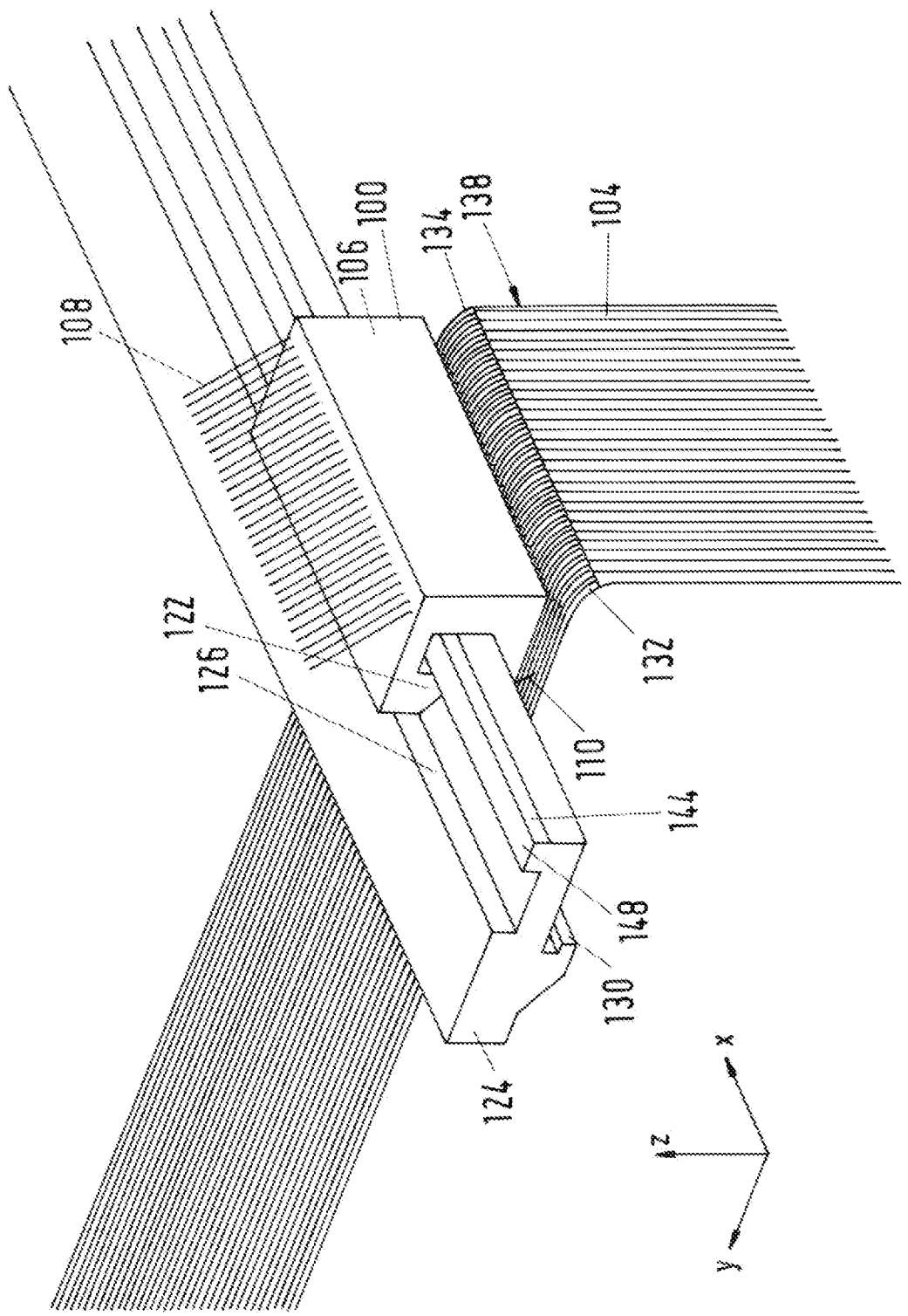

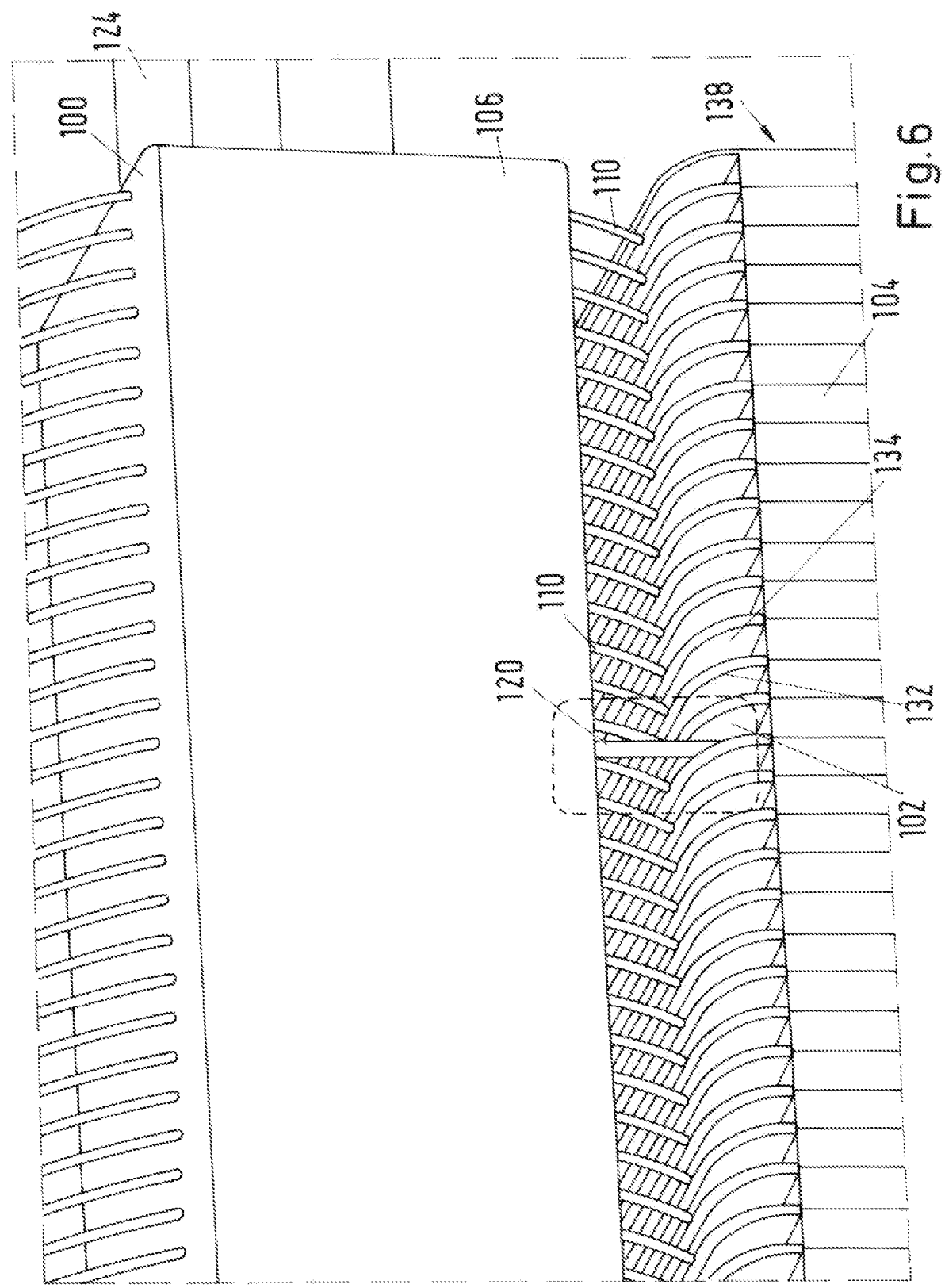

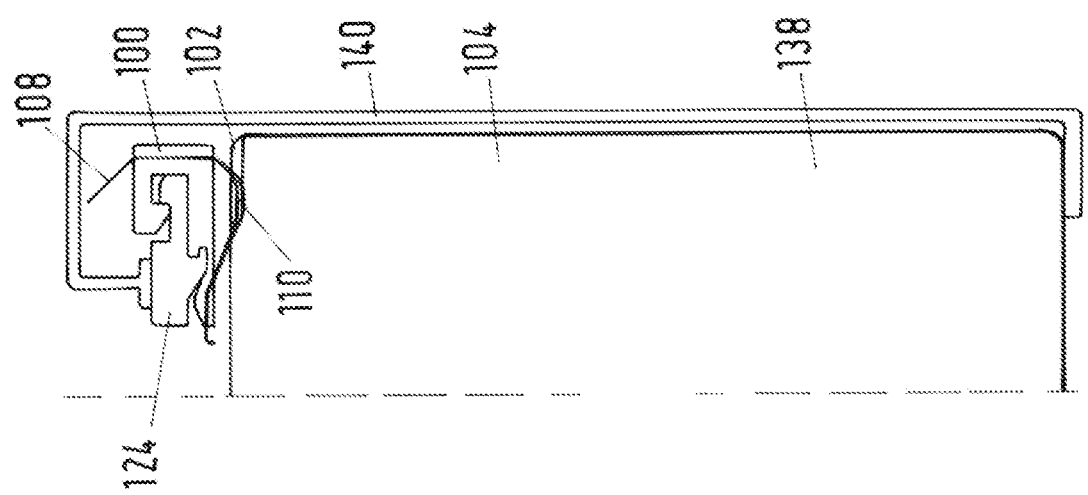

PLUG CONNECTOR, BIPOLAR PLATE AND COMBINATION OF A PLUG CONNECTOR AND A FUEL CELL STACK

BACKGROUND

Technical Field

Embodiments of the invention relate to a plug connector for making electrical contact with a multiple number of bipolar plates having a contact groove, with a plug body formed from electrically insulating material, through which plug body a multiple number of electrically separated contact elements is guided, one contact element of each of which engages in a corresponding contact groove of one of the bipolar plates and thereby makes electrical contact with the bipolar plate. Embodiments of the invention also relate to a bipolar plate for a fuel cell stack and a combination of a plug connector and a fuel cell stack.

Such plug connectors are used in fuel cell systems to monitor the voltages of the individual fuel cells in the fuel cell stack. They are thus part of a cell voltage monitoring system ("CVM"), which monitors the individual electrical potentials between the anode and the cathode of the membrane electrode assemblies (MEA) of the fuel cell system. In addition to the control unit for monitoring and evaluation, this requires a reliable contacting of the current-carrying bipolar plates.

Description of the Related Art

DE 10 2016 210 316 A1 here proposes positioning individual connecting elements between two adjacent bipolar plates, wherein the connecting element is formed from two parts that can be displaced against each other in order to reliably contact the two bipolar plates, even if the fuel cell stack is subject to expansions caused by operation. DE 10 2010 014 080 A1 likewise describes a system for contacting a multiple number of fuel cells using a single circuit board, which is connected to the bipolar plates by a conductive compressible connector or directly through a plate contactor. An additional system for monitoring cell voltages is described in EP 2 907 188 B 1.

US 2007/0108960 A1 describes a device for monitoring individual cell voltages in which individual contact pins engage in individual contact grooves of bipolar plates, wherein the contact pins are designed to be telescopic or compressible along their longitudinal axis. All contact pins are positioned within a groove of a plug body and can slide along this groove, in order to ensure that bipolar plates of different heights and thicknesses are securely electrically contacted.

With the solutions known from the prior art, it has turned out to be disadvantageous that the electrical contacting often does not have the required mechanical stability, or that geometric compensation is not sufficiently ensured. Geometric compensation is required on account of manufacturing tolerances, production tolerances, linear expansions during operation and deflections due to weight forces or centrifugal forces. In addition, solutions in the prior art have shown that a rapid and reliable assembly is not possible.

BRIEF SUMMARY

Embodiments of the invention provide a plug connector, a bipolar plate, and a combination of a plug connector and a fuel cell stack that overcome the disadvantages set forth above.

According to one embodiment, a plug connector for making electrical contact with a multiple number of bipolar plates having a contact groove is provided and is characterized in particular by the fact that each of the contact elements is designed as an elastically deformable wire bracket engaging in the contact groove.

The use of such a wire bracket has proven to be advantageous in that it can carry out a compensating movement in the longitudinal direction of the fuel cell stack (x-direction). However, a veering movement in a direction perpendicular to the longitudinal direction of the fuel cell stack (z-direction) is also made possible through the use of the wire bracket, such that there is always a secure contact of the contact element with the contact groove assigned to it.

A reliable contacting and a more stable wire bracket can be achieved by ensuring that each of the contact elements is guided at least twice through the plug body to form the wire bracket.

There may also be a need to limit the possible veering movement or deflection of the wire brackets, wherein it has proved to be advantageous if the contact elements, in particular terminal contact elements, are fitted with a stop element and if the plug body has a stop for the stop element. This design enables an at least one-sided limitation of an elastic deformation of the wire bracket.

It is also possible for the plug body to have a spacer, in particular a spacer pin, which is formed to support the plug body against a bipolar plate, wherein the spacer may also be insertable into a contact groove of the bipolar plate. This spacer not only ensures a specified distance between the plug body and the bipolar plates in the z-direction, but can also be used to carry along the plug body in the x-direction, i.e., in the longitudinal direction of the fuel cell stack; hence therefore to displace it. This means that the spacer can be used to reduce loads on the contacting wires, i.e., on the wire brackets. Of course, it is also possible to provide several such spacers, which in each case may engage in a contact groove of the bipolar plate. The spacer can be formed from an electrically insulating material.

The assembly of the plug connector with a fuel cell stack is simplified by the fact that the plug body has a latching lug that is formed to latch with a latching recess formed in a slide rail. For example, a noise indicator (e.g., indicating by a click) may be present to provide the installer with the information that the plug connector is in the correct position relative to the fuel cell stack.

For an even better attachment of the plug connector to a slide rail, it has proved advantageous if the plug body has a securing holder that is designed to accommodate a securing strip formed on a slide rail.

A bipolar plate for a fuel cell stack is characterized by a contact groove provided with a groove extension. The groove extension may take the form of a widening section at the contact groove of the bipolar plate. This makes it easier to insert the wire bracket into the contact groove and ensures that the wire bracket slides only into the contact groove intended for it. The widening section may be formed at an insertion end of the contact groove.

It has also proved advantageous for the contact groove at one end remote from the inserting element to have a control surface that is designed to interact with the wire bracket of the contact element. This control surface facilitates an elastic deformation of the wire bracket, so that no plastic deformations such as kinks or the like occur on the wire bracket.

For an additional option of providing a compensating movement of the wire bracket, it has proved useful for the groove extension to be designed as a contact groove of the bipolar plate that is trapezoidal in cross-section. The contact groove is thus designed to widen in the z-direction, so that the wire bracket has greater room to maneuver in the x-direction in order to provide a compensating movement.

The advantages and embodiments described for the plug connector also apply to a corresponding combination of such a plug connector with a fuel cell stack, which comprises a multiple number of bipolar plates having at least one contact groove.

This combination is characterized in particular by its reliable assembly, which dependably prevents its components or parts from failing due to excessive insertion or extraction forces or due to excessive accelerations during operation.

In this connection, it has also proved to be advantageous for a slide rail to be provided, to which the plug connector for making electrical contact with the bipolar plates is attached, in particular in a sliding manner. Here it is advantageous for either the plug body or parts of the plug body to be made of a material with optimized sliding properties or having an corresponding coating. Alternatively or as a supplement, the slide rail can also be made of a material with optimized sliding properties. Between the plug connector and the slide rail there may be a suitable tribological material pairing with a low coefficient of sliding friction.

The slide rail is provided so that the plug connector can perform compensating movements in the longitudinal direction of the stack, said movements being introduced into the plug body via the wire brackets of the contact elements, for example. It is also possible to attach or form a spacer, in particular a spacer pin, on the plug body, which additionally facilitates the displacement of the plug body with respect to the slide rail.

An additional or alternative option for compensating for expansion in the z-direction is to geometrically couple the slide rail to the bipolar plate, in particular to the opposite side of the bipolar plate facing away from the slide rail. A large part of the expansion in the z-direction is caused by a "sagging" of the fuel cell stack due to the weight force and due to possible dynamic external forces. In this connection, it has therefore proved advantageous for a force transmission element to be connected to the slide rail, which force transmission element being designed to transmit bending forces of the fuel cell stack to the slide rail, thus ensuring a constant distance between the plug connector and the contact groove of the bipolar plate.

The force transmission element may be a securing arm at least partially surrounding the bipolar plates, which is formed to transmit the movement or bending of the fuel cell stack to the slide rail and thus to the plug connector connected to the slide rail. Such a configuration is also advantageous because, for manufacturing and technical reasons, it is frequently not possible to screw such a slide rail directly to the bipolar plates.

The features and combinations of features mentioned above in the description and the features and combinations of features mentioned below in the description of the figures and/or shown in the figures alone can be used not only in the combination given in each case but also in other combinations or individually, without departing from the scope of the invention. Designs that are not explicitly shown or explained in the figures but result from and can be produced through separate combinations of features from the embodiments described are thus also to be regarded as covered and disclosed by the invention.

BRIEF DESCRIPTION OF THE SEVERAL VIEWS OF THE DRAWINGS

Additional advantages, features and details of the invention arise from the claims, the following description of example embodiments and on the basis of the drawings. The following is shown:

FIG. 1 illustrates a side view of a part of a combination of a plug connector with a bipolar plate of a fuel cell stack, wherein the plug connector is attached to a slide rail, FIG. 2 illustrates a perspective view of a part of the combination in FIG. 1, FIG. 5 illustrates an additional perspective view of a part of a combination according to FIG. 1 with an elongated slide rail, FIG. 6 illustrates a perspective view of a part of a combination with a plug connector having a spacer, and FIG. 7 illustrates a side view of a part of a combination comprising a force transmission element.

DETAILED DESCRIPTION

Figure 4:
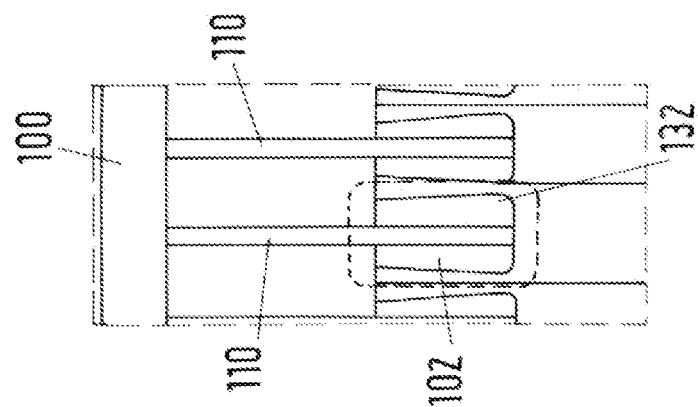
FIG. 4 illustrates a side view of a part of a combination in which the wire bracket is inserted into contact grooves of bipolar plates.

The figures show the components of a combination of a plug connector 100 and a fuel cell stack 138 comprising a multiple number of bipolar plates 104 having at least one contact groove 102 (FIG. 2). Such components are parts of a system for individual cell-voltage monitoring of the voltages of individual fuel cells within the fuel cell stack 138 (CVM=cell voltage monitoring).

Between the bipolar plates 104 of the fuel cell stack 138, there is in each case a membrane electrode assembly (MEA), which is formed from a cathode and an anode along with a proton-conducting membrane separating the cathode from the anode. The membrane is formed from an ionomer, which may be a sulfonated tetrafluoroethylene polymer (PTFE) or a polymer of perfluorinated sulfonic acid (PFSA). Alternatively, the membrane may take the form of a sulfonated hydrocarbon membrane.

A catalyst may additionally be admixed with the anodes and/or the cathodes, wherein the membranes may be coated on their first side and/or on their second side with a catalyst layer made of a noble metal or a mixture comprising noble metals such as platinum, palladium, ruthenium or the like, which serve as reaction accelerators in the reaction of the particular fuel cell.

Fuel (for example, hydrogen) can be supplied to the anode via an anode chamber formed in the bipolar plate 104, wherein, in a polymer electrolyte membrane fuel cell (PEM fuel cell), fuel or fuel molecules are split into protons and electrons at the anode. The PEM allows the protons to pass through, but is impermeable to the electrons. For example, the following reaction takes place at the anode: $2H_2 \rightarrow 4H^+ + 4e^-$ (oxidation/electron release). While the protons pass through the PEM to the cathode, the electrons are conducted via an external circuit to the cathode or to an energy storage device. The cathode gas (e.g., oxygen or air containing oxygen) can be supplied to the cathode via a cathode chamber, which is likewise formed in one of the bipolar plates 104, such that the following reaction takes place on the cathode side: $O_2 + 4H^+ + 4e^- \rightarrow 2H_2O$ (reduction/gain of electrons). For example, in order to provide the electrical power required for a drive, the fuel cells are connected in series to form a fuel cell stack 138. However, there is a need to detect the voltage generated by each individual cell in order in particular to monitor its function.

The plug connector 100 designed to make electrical contact with a multiple number of bipolar plates 104 having a contact groove 102 is used for this purpose. It has a plug body 106, which is made of electrically non-conductive, thus electrically insulating, material. A multiple number of contact elements 108, which are electrically isolated from each other by the plug body 106, are guided through the plug body 106. Each of the contact elements 108 engages in a corresponding contact groove 102 of a corresponding bipolar plate 104, whereby the bipolar plate 104 concerned is electrically contacted by the contact element 108.

FIG. 1 shows that the contact element 108 takes the form of a wire bracket 110, which is elastically deformable in order to be able to perform compensating movements in the z-direction, as shown by the dashed representation of the wire bracket 110. In the present case, in order to form the wire bracket 110, the contact elements are guided through the plug body 106 twice, specifically through a first bushing 112 in the plug body 106 and through a second bushing 114 in the plug body 106. The first bushing 112 has a section oriented essentially along or parallel to the z-direction, wherein the second bushing 114 comprises a section extending essentially along or parallel to the y-direction. It can be seen that the contact elements 108 emerge again from the second bushing 114 and have at their ends a stop element 116, which is formed in the present case by a folding or a bending of the contact element 108. The dashed representation of the contact element 108 shows that the wire bracket 110 is deformable in such a way that the contact element 108 projects from the plug body 106. However, in order to ensure that the wire bracket 110 only has a predetermined expansion or deflection, there is a stop 118 on the plug body 106, which stop limits the movement of the stop element 116 of the contact element 108.

In addition, the movement of the wire bracket 110 is assisted by the fact that the bipolar plate 104 has, within its contact groove 102, a control surface 136 that facilitates the guidance of the contact element 108, i.e., the wire bracket 110, in the direction of the second bushing 114. The use of a control surface 136 also ensures that no plastic deformations occur on the contact element 108, in particular that kinks or bends are avoided on the contact elements 108.

It should be noted that the contact elements 108 can take the form of a contact wire, and in particular are designed as spring wire in order to secure the highest possible contact pressure, even when the bipolar plates 104 expand. However, if the contact groove 102 of the bipolar plates 104 is appropriately designed, a flat wire can also be used instead of a round wire, thereby increasing the contact area and thus enabling even more reliable voltage monitoring of the individual cells, since there is then a surface contact, and not a line contact, between the contact element 108 and the bipolar plate 104 in question.

In the present case, the plug connector 100 is attached to a slide rail 124 with its plug body 106. For this purpose, the plug body 106 has a latching lug 122 that is formed to latch in a latching recess 126 formed in the slide rail 124. The slide rail 124 frequently cannot be connected directly to the bipolar plates 104, but is attached, for example, to the end plates of the fuel cell stack 138 or even to an element that is not part of the fuel cell stack 138. The slide rail 124 itself has a latching element 148, which in particular is connected to the latching recess 126, which element is designed to engage behind the latching lug 122 of the plug body 106, in particular if the plug body 106 is converted into a latched configuration relative to the slide rail 124.

For further secure attachment of the plug body 106 to the slide rail 124, the plug body 106 has a sliding surface 142 on the one hand, which is inclined with respect to the z-direction. In contrast, on the slide rail, in particular on the latching element 148, a counterpart sliding surface 144 is formed on the other side, such that when the plug body 106 is moved against the slide rail 124, the plug body 106 expands until the latching between the plug body 108 and the slide rail 124 is effected.

In addition, in the present case, the plug body 106 is also provided with an insertion contour 146, which merges into a securing holder 128 of the plug body 106. This securing holder 128 is formed to accommodate a securing strip 130 of the slide rail 124. Such securing has the function of fixing the plug connector 100 in its position opposite the slide rail 124, both in the y-direction and in the z-direction. However, in the x-direction, the plug connector 100 is mounted is a sliding manner with respect to the slide rail 124. This sliding mounting in the longitudinal direction of the stack serves to compensate for the expansion of the fuel cell stack 138 during operation. Forces introduced from the fuel cell stack 138 via the bipolar plates 104 into the wire bracket 110 can thereby be transmitted to the plug body 106, so that the plug body 106 can slide along the slide rail 124 in order to compensate for the forces introduced.

In the perspective view shown in FIG. 2, it can be seen that a multiple number of the contact elements 108 are guided through the plug body 106 and each of the bipolar plates 104 is provided with its own contact groove 102, into which one of the contact elements 108 taking the form of a wire bracket 110 engages. The plug connector 100 can be plugged onto the slide rail 124 in the y-direction, wherein the wire brackets 110 are inserted into the contact grooves via their insertion end 134, in particular front insertion end.

Figure 3:
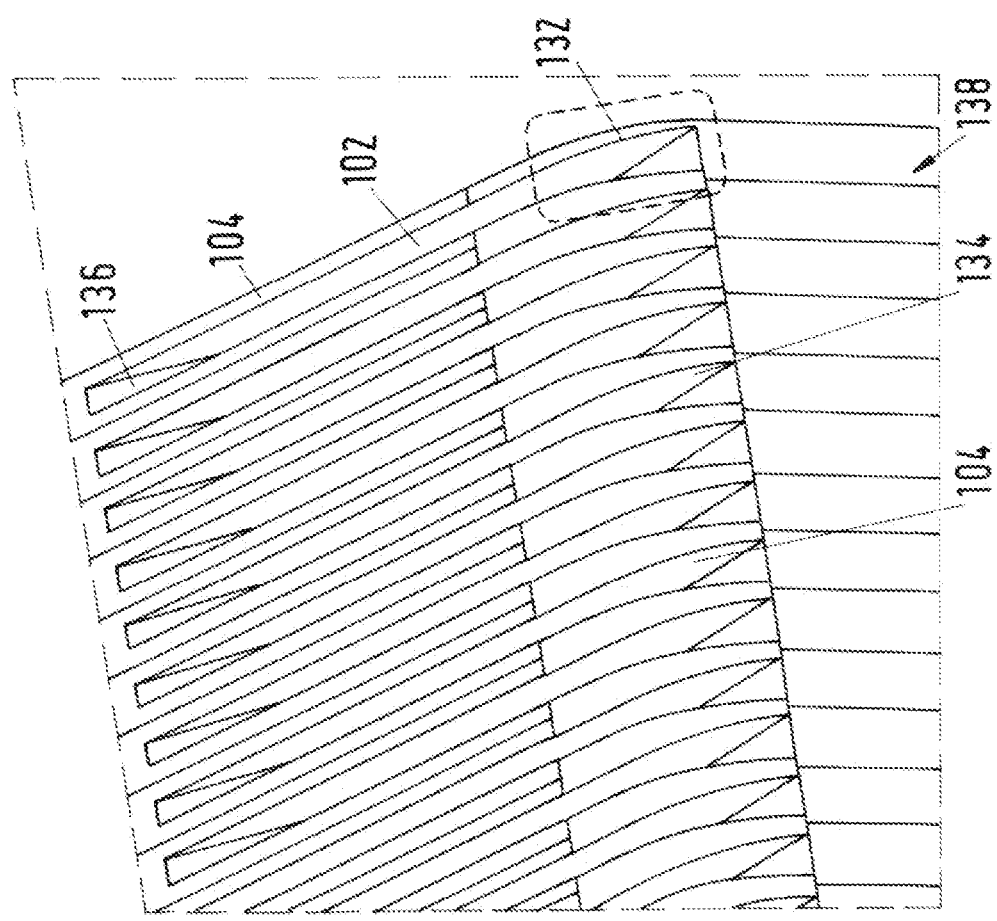
FIG. 3 illustrates a view of a part of a fuel cell stack comprising a plurality of bipolar plates.

The configuration of the bipolar plates 104 can be seen in greater detail with the aid of FIG. 3, wherein each of the contact grooves 102 is provided with a groove extension 132, which in this case is located through a widening section at the insertion end 134 of the contact groove 102. In addition, the control surface 136 of the contact groove 102, which serves to further guide the wire brackets 110, can be seen.

FIG. 4 shows a side view of the combination in which one of the wire brackets 110 of the plug connector 100 is inserted into the contact groove 102. A groove extension 132 is also present here as well, this being created by a trapezoidal design of the cross-section of the contact groove 102. Moreover, through this trapezoidal contact groove 102, which widens downwards in the direction of a center of the bipolar plate 104, a compensating movement of the wire bracket 110 within the contact groove 102 takes place in the longitudinal stacking direction.

On the basis of the representation in FIG. 5, it can be seen that the slide rail 124 can be significantly longer in its longitudinal direction than the plug body 106. A multiple number of plug connectors 100 can thus be attached to a single slide rail 124, said plug connectors being mounted along the slide rail 124 in a displaceable manner for the compensation of length of the fuel cell stack 138 during operation.

If the wire brackets 110 are not rigid enough to transmit the forces exerted by the fuel cell stack 138 into the plug body 106, FIG. 6 shows the option of using a spacer 120, which in the present case is formed to likewise be accommodated in a contact groove 102 of a bipolar plate 104. This spacer 120 ensures a defined distance between the bipolar plate 104 and the plug body 106, on the one hand in the z-direction and on the other hand additionally results in the plug body 106 being carried along should the fuel cell stack 138 expand in the x-direction. In other words, this mechanical pin is designed to move the plug body 106 along the slide rail 124.

Finally, FIG. 7 shows a combination with which a force transmission element is connected to the slide rail 124, which element is formed to transmit bending forces from the fuel cell stack 138 to the slide rail 124. Due to the weight of the fuel cell stack 138, it may occur that the fuel cell stack 138 "sags" lengthwise, in particular in the middle. In such cases, a secure electrical connection of the plug connector 100, in particular contact elements 108, to bipolar plates 104 must be ensured. The force transmission element also transmits a bending of the fuel cell stack 138 to the slide rail 124 and thus to the plug connector 100, such that the electrical connection remains guaranteed.

In the present case, the force transmission element takes the form of a securing arm 140 that at least partially surrounds the bipolar plates 104, which is designed to transmit the movement or the bending of the fuel cell stack 138 to the slide rail 124 and thus to the plug connector 100 connected to the slide rail 124. The securing arm 140 may be formed from an electrically non-conductive, insulating material, such that the electrical insulation of the individual bipolar plates 104 is guaranteed.

The embodiments of the invention described above enable the implementation of a plug-in contact to monitor the individual cell voltages of a fuel cell stack 138 without additional pins or clips being inserted into the individual bipolar plates 104. In addition, assembly of the plug connector 100 with the fuel cell stack 138 is simplified and susceptibility to errors is reduced. Moreover, the forces in the x-direction, in the y-direction and in the z-direction are securely and sufficiently compensated by the appropriate combination of a plug connector 100 and the fuel cell stack 138.

German patent application no. 10 2018 216265.4, filed Sep. 25, 2018, to which this application claims priority, is hereby incorporated herein by reference in its entirety. Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plug connector for making electrical contact with a plurality of bipolar plates, each of the bipolar plates having a contact groove, the plug connector comprising:
   a plug body formed from electrically insulating material, the plug body including a first bushing and a second bushing; and
   a plurality of contact elements, each of the contact elements electrically separated from one another,
   wherein each of the contact elements extends through the plug body a first time along a first axis through the first bushing of the plug body and a second time along a second axis through the second bushing of the plug body, wherein the first axis is perpendicular to the second axis, and wherein each of the contact elements engages a contact groove of a respective one of the bipolar plates, thereby making electrical contact with the respective one of the bipolar plates, and
   wherein each of the contact elements includes an elastically deformable wire bracket engaging the contact groove of the respective one of the bipolar plates.

2. The plug connector according to claim 1, wherein each of the contact elements includes a respective stop element, and wherein the plug body includes a stop configured to engage each stop element to limit elastic deformation at an end of the wire bracket.

3. The plug connector according to claim 1, wherein the plug body includes a spacer configured to abut against a bipolar plate.

4. The plug connector according to claim 1, wherein the plug body includes a latching lug configured to latch with a latching recess formed in a slide rail.

5. The plug connector according to claim 1, wherein the plug connector is coupled to a fuel cell stack including a plurality of bipolar plates, wherein each of the bipolar plates has at least one contact groove.

6. A plug connector for making electrical contact with a plurality of bipolar plates, each of the bipolar plates having a contact groove, the plug connector comprising:
   a plug body formed from electrically insulating material; and
   a plurality contact elements, each of the contact elements electrically separated from one another,
   wherein each of the contact elements extends through the plug body and engages a contact groove of a respective one of the bipolar plates, thereby making electrical contact with the respective one of the bipolar plates,
   wherein each of the contact elements includes an elastically deformable wire bracket engaging the contact groove of the respective one of the bipolar plates, and
   wherein the plug body has a securing holder configured to accommodate a securing strip formed on a slide rail.

7. A plug connector for making electrical contact with a plurality of bipolar plates, each of the bipolar plates having a contact groove, the plug connector comprising:
   a plug body formed from electrically insulating material; and
   a plurality contact elements, each of the contact elements electrically separated from one another,
   wherein each of the contact elements extends through the plug body and engages a contact groove of a respective one of the bipolar plates, thereby making electrical contact with the respective one of the bipolar plates,
   wherein each of the contact elements includes an elastically deformable wire bracket engaging the contact groove of the respective one of the bipolar plates,
   wherein the plug connector is coupled to a fuel cell stack including a plurality of bipolar plates, wherein each of the bipolar plates has at least one contact groove, and
   wherein the plug connector is fixed in a sliding manner to a slide rail such that the plug connector is in electrical contact with the bipolar plates.

8. The plug connector according to claim 7, further comprising a force transmission element connected to the fuel cell stack and to the slide rail to transmit bending forces of the fuel cell stack to the slide rail.

* * * * *